United States Patent [19]
Harcourt et al.

[11] Patent Number: 5,971,007
[45] Date of Patent: Oct. 26, 1999

[54] PISTON VALVE

[75] Inventors: Robert Harcourt, Erie; Tom Dawson, Union City, both of Pa.

[73] Assignee: Snap-Tite Technologies, Inc., Wilmington, Del.

[21] Appl. No.: 09/044,360

[22] Filed: Mar. 19, 1998

[51] Int. Cl.$^6$ .............................. F16K 31/50; F16K 1/02
[52] U.S. Cl. .................................. 137/246.22; 73/866.5; 137/551; 251/214; 251/267; 251/325
[58] Field of Search .................. 73/866, 866.5; 137/551, 557, 256, 260, 246.22; 251/214, 266, 267, 270, 324, 325, 326, 327

[56] References Cited

U.S. PATENT DOCUMENTS

| 677,085 | 6/1901 | Johnson | 251/270 |
|---|---|---|---|
| 984,243 | 2/1911 | Schmid et al. | 251/267 |
| 1,001,970 | 8/1911 | McCarthy | 251/267 |
| 2,062,422 | 12/1936 | Meese | 251/270 |
| 2,358,981 | 9/1944 | Lattner | 137/551 |
| 3,327,992 | 6/1967 | Billeter et al. | 251/267 |
| 3,658,291 | 4/1972 | Meges | 251/266 |
| 3,889,925 | 6/1975 | Brooks | 251/327 |
| 4,406,304 | 9/1983 | Vamvakas | 251/266 |
| 4,433,827 | 2/1984 | Redmon et al. | 251/270 |
| 4,592,534 | 6/1986 | Ueda et al. | 251/266 |
| 5,083,743 | 1/1992 | Gordon et al. | 251/267 |
| 5,560,392 | 10/1996 | Spang et al. | 251/315.11 |

FOREIGN PATENT DOCUMENTS

| 973477 | 2/1951 | France | 251/267 |
|---|---|---|---|

*Primary Examiner*—George L. Walton
*Attorney, Agent, or Firm*—Woodling, Krost and Rust

[57] ABSTRACT

A piston valve for use in connection with the fire protection industry is disclosed which includes features for protecting against corrosion. A sacrificial zinc anode is mounted in the body of the valve under the handwheel. A polymeric piston is used which cannot corrode. A grease fitting protects against corrosion at the interface of the spindle and the valve body or bushing within the body.

5 Claims, 3 Drawing Sheets

PISTON VALVE

FIELD OF THE INVENTION

The instant invention is a piston intake valve mounted on a fire truck. These valves are well known in the fire fighting industry. In particular, this valve is connected to a fire plug to fill the storage chamber on the fire truck. When the fire fighting emergency is over the chamber on the fire truck is full and the valve is closed. Thus, one side of the valve remains wet at all times.

BACKGROUND OF THE INVENTION

Piston intake valves are known in the industry. It is further known that they are kept wet. Corrosion is a known problem. In particular, corrosion is caused by various factors including, but not limited to, use of dissimilar metals and use of waters having different mineral content. The water is an electrolyte which promotes corrosion between the piston and the cylinder wall, the spindle and the piston, and the spindle and the housing.

The fire truck upon which the piston valve is mounted is made of steel. The piston and the housing are typically made of aluminum. The spindle which drives the piston is made from stainless steel.

The combination of steel, aluminum, and certain ions in the water usually portend trouble for a fire department in the use of these valves. In some areas of the country the composition of the water exacerbates the problem thus causing time consuming maintenance on the valves.

SUMMARY OF THE INVENTION

It is an object of the instant invention to provide a polymeric piston which eliminates corrosion between the piston and the cylinder wall.

It is an object of the instant invention to provide a spindle for use in the valve which includes a grease fitting and a port or ports for the admission of grease between the spindle, bushings and the body of the valve.

It is an object of the instant invention to provide a polymeric piston which eliminates corrosion between the piston and the spindle.

It is an object of the instant invention to provide a sacrificial anode to control corrosion of the valve and its parts.

It is an object of the instant invention to provide a sacrificial zinc anode to control corrosion of the valve and its parts.

It is an object of the present invention to include a sacrificial anode to deliberately establish a galvanic cell to control corrosion of the valve and its parts through the sacrifice of the anode.

It is an object of the present invention to use the sacrificial anode to protect against the interior surface corrosion of the valve and its parts. A galvanic cell is established by the more easily corroded anode which causes the other metal surfaces in the valve to become cathodic.

The instant invention discloses and teaches the use of a polymeric piston driven by the rotation of a stainless steel spindle. Rotation of the piston is prohibited by the use of one or more guides which ride in slots or grooves formed in the body of the valve. The valve includes a stainless steel liner which is adhesively affixed to the body of the valve. The polymeric piston seals against a polymeric seal so as to close the inlet port of the valve. A urethane seal is utilized to seal the polymeric piston against the stainless steel cylinder or liner as it is sometimes referred to herein. The valve is retractable to an open position so as to permit flow of water between the inlet and outlet ports.

A sacrificial anode is mounted in one end of the body of the valve. Those skilled in the art will recognize that there are a plurality of different ways that the sacrificial anode could be mounted in the body of the valve without departing from the spirit and the scope of the instant invention.

A grease fitting is affixed to the spindle and the fitting communicates with a passageway whereby grease is transmitted to the interface between the spindle and the bushing within which the bushing is mounted. Grease is also transmitted to the body of the valve.

A better understanding of the objects of the instant invention will be understood when taken in conjunction with the Brief Description Of The Drawings and the Detailed Description Of The Invention set forth below.

DETAILED DESCRIPTION OF THE INVENTION

Figure 1:
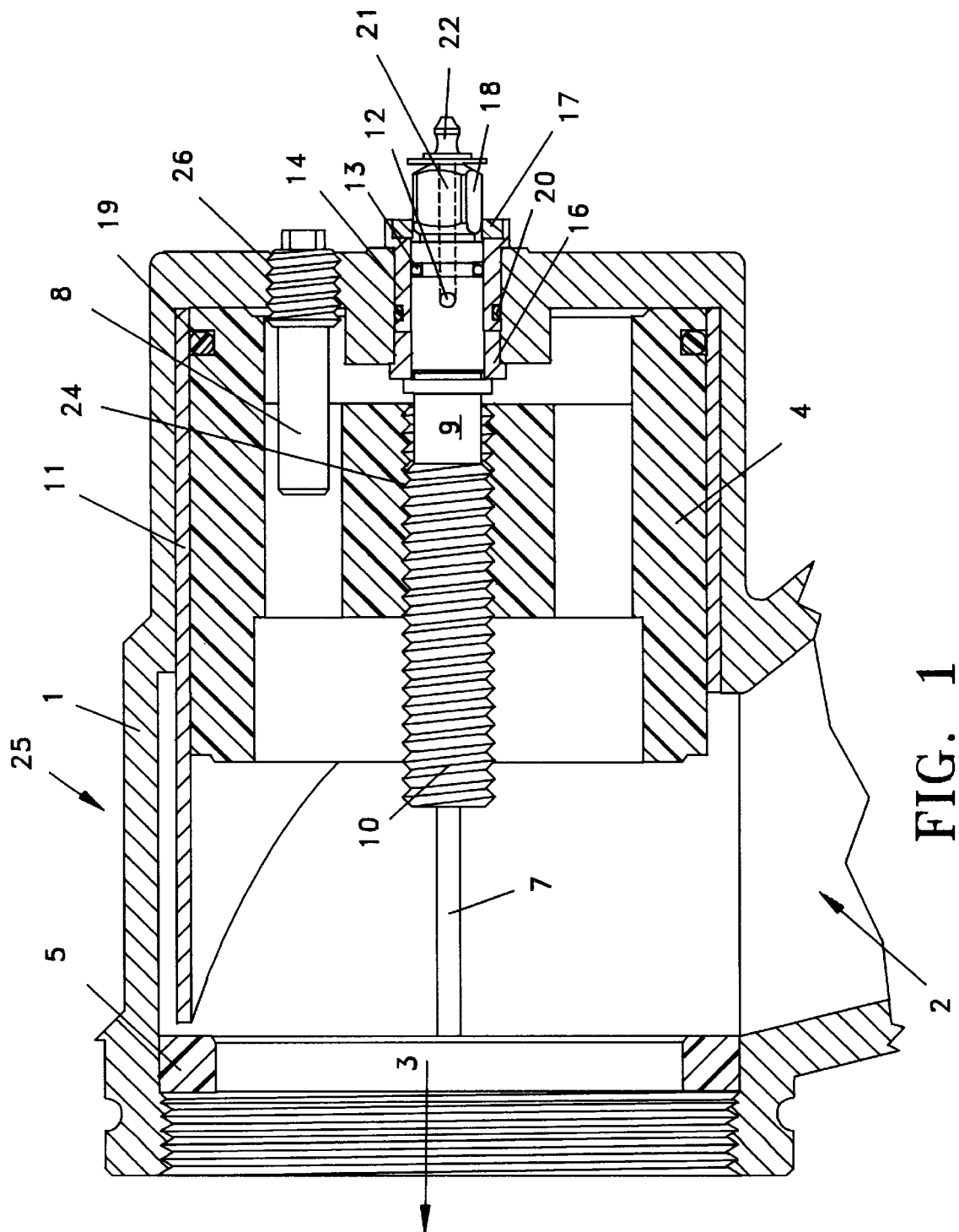
FIG. 1 is a partial cross-sectional view of the piston valve illustrating the valve body, the zinc anode, grease fitting and the polymeric piston.

FIG. 1 is a partial cross-sectional view of the piston valve 25 illustrating the body 1, the zinc anode 8, grease fitting 22 and the polymeric piston 4. FIG. 1 illustrates the inlet port 2 and the outlet port 3. Seal 5 engages the polymeric piston 4 to seal the valve when water is not being admitted to the inlet port 2. Inlet port 2 is connected to a fire plug or other water supply apparatus. Outlet port 3 is connected to a water supply chamber (not shown) on the fire truck from which water is pumped to fight a fire.

Polymeric guides 6 are affixed to the polymeric piston 4. See, FIG. 3. There are a variety of ways by which the polymeric guides may be affixed to the piston, for instance, they may be glued, threaded, or press fit. The guides 6 rides in slots 7 (See, FIGS. 1 and 2) which are formed in the body 1 of the valve 25. There may be a plurality of the guides and slots used about the circumference of the interior of the valve.

Polymeric piston 4 slides along stainless steel cylinder 11 which is adhesively affixed to the body of the valve 1. Those skilled in the art will recognize that cylinder 11 may be made from plastic or aluminum. Sleeve 11 may be cylindrical or it may be a truncated, or partially cutaway, cylinder to facilitate flow from outlet port 2 to outlet port 3. See, FIGS. 1 and 2. Polymeric piston 4 is urged from the open position illustrated in FIGS. 1 and 2 to the closed position by spindle 9. Spindle 9 includes an end portion 10 having threads thereon. Spindle 9 is rotatable with respect to the body 1. As spindle 9 rotates the threaded end 10 thereof engages the interior threads 24 of the polymeric piston 4 which urge the piston 4 to either an open or closed position depending on the direction of the rotation of the spindle. Seal 19 prohibits flow from the outlet port 3 back to the inlet port 2 of the valve when the piston 4 is in the closed position (all the way leftwardly).

Sacrificial anode 8 which is preferably a zinc anode is mounted by a threaded interconnection 26 in the body 1 of the valve 25. The zinc anode is easily removable on a periodic basis. The period of the replacement of the anode will depend on its rate of corrosion which is dependent the electrolytic rate which is dependent on the properties of the water that resides within the valve when it is closed. The instant invention allows easy maintenance of the valve through periodic replacement of the anode coupled together with periodic greasing of the spindle.

The valve 25 is opened only for brief times when water is admitted into the storage chamber on the truck. As such, the valve is closed the majority of the time. It is this time when the majority of the electrolysis is taking place. In this condition, piston 4 would be moved leftwardly when viewing FIGS. 1 and 2 and a seal would be formed at the interface of the piston 4 and the seal 5. Thus, the valve 25 sits constantly full of water. It is imperative that valve 25 be operable when fighting a fire. The invention disclosed herein enable reliable operation and simplified maintenance of the valve.

Grease fitting 22 is affixed to the spindle 29 and communicates with a passageway 21 in the spindle which itself is in communication with one or more grease ports 12. Periodically, grease is admitted to the fitting and it freely flows out of ports 12 and along the interface between spindle 9 and inner bushing 16 and outer bushing 14. Seal 13 seals the spindle 9 with respect to the outer bushing and seal 20 seals the outer bushing 14 with respect to the body 1. Teflon washer 17 resides intermediate the outer bushing 14 and the spindle. Reference numeral 18 indicates a hexagonal end of spindle 9.

Figure 2:
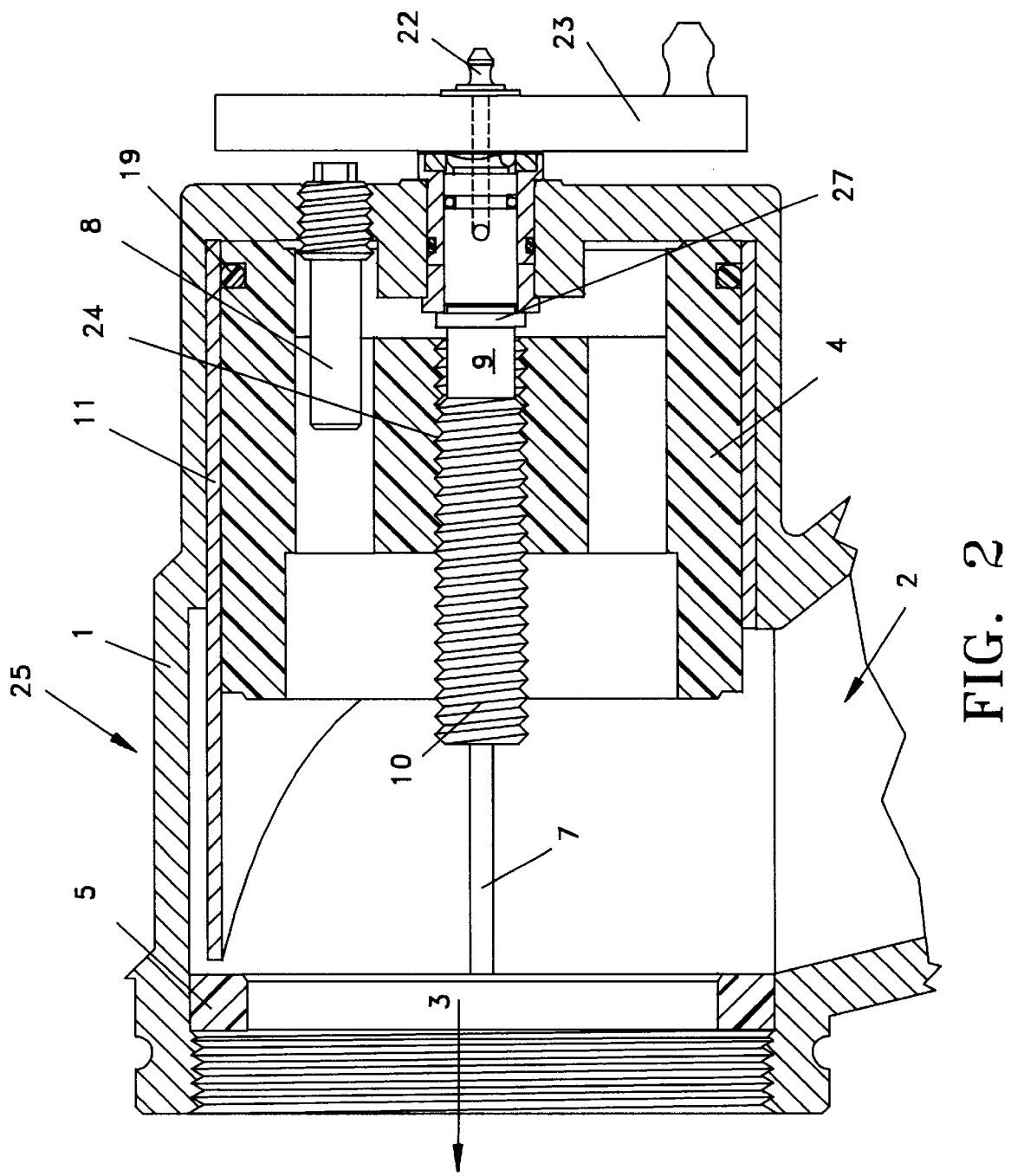
FIG. 2 is a view similar to FIG. 1 and additionally illustrates the handwheel affixed to said spindle.
Figure 3:
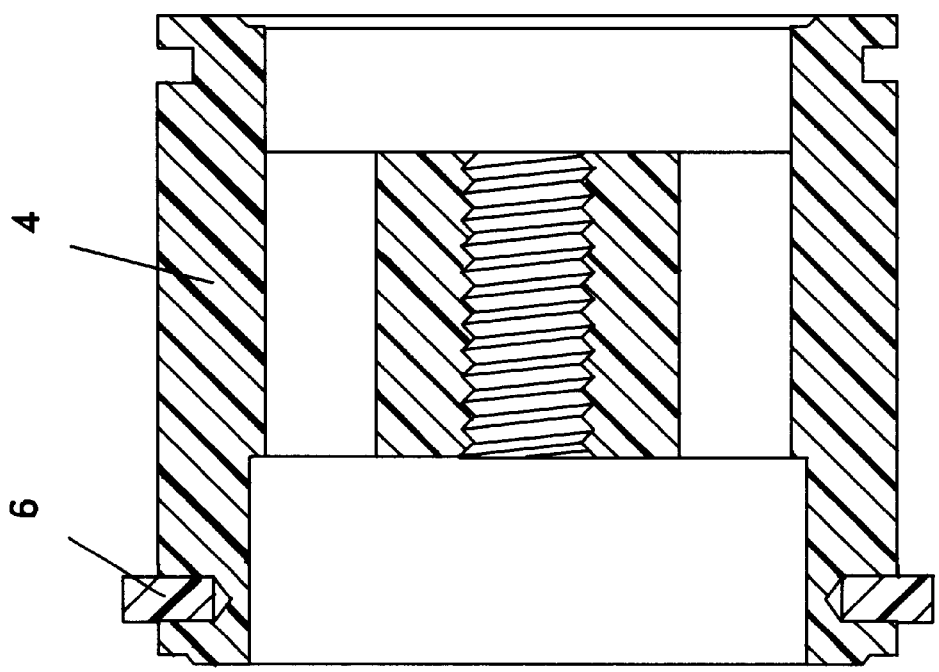
FIG. 3 is a cross-sectional view of the plastic valve and guides.

FIG. 2 is a view similar to FIG. 1 and additionally illustrates the handwheel 23 affixed to said spindle 9. Typically, the handle 25 is affixed by a set screw. Handle 25 restrains the spindle 9 from movement leftwardly and shoulder 27 on spindle 9 restrains spindle 9 from leftward movement of the spindle.

The foregoing description of the invention has been set forth by way of example only and those skilled in the art will recognize that many changes and deviations may be made to the invention without departing from the spirit and scope of the appended claims.

I claim:

1. A piston valve for controlling the flow of electrolytic fluid therein comprising; a body; a sleeve; a polymeric piston movable with respect to said sleeve; a spindle for moving said piston and opening and closing said valve; said spindle including a grease fitting for lubricating said spindle and said body of said valve; a sacrificial anode mounted to said body and extending inwardly therefrom into said valve body; and, said sacrificial anode combining chemically with said electrolytic fluid such that said anode is gradually dissolved in said electrolytic fluid at a rate dependent upon the properties of said electrolytic fluid thereby protecting said body, said sleeve, and said piston from corrosion.

2. A piston valve as claimed in claim 1 wherein said sleeve is affixed to said body.

3. A piston valve as claimed in claim 2 further comprising a guide mounted in said polymeric piston for preventing rotation of said piston.

4. A piston valve for controlling the flow of electrolytic fluid therein comprising: a body; a sleeve affixed to said body; a polymeric piston movable with respect to said sleeve; a spindle for moving said piston and opening and closing said valve; said spindle including a grease fitting for lubricating said spindle; and, a bushing for mounting said spindle with respect to said body; a sacrificial anode mounted to said body and extending inwardly therefrom into said valve body; and, sacrificial anode combining chemically with said electrolytic fluid such that said anode is gradually dissolved in said electrolytic fluid at a rate dependent upon the properties of said electrolytic fluid thereby protecting said body, said sleeve, and said piston from corrosion.

5. A piston valve as claimed in claim 4 wherein said sleeve is a truncated cylinder.

* * * * *

UNITED STATES PATENT AND TRADEMARK OFFICE
CERTIFICATE OF CORRECTION

PATENT NO : 5,971,007
DATED : October 26, 1999
INVENTOR(S): Robert Harcourt, et al.

It is certified that error appears in the above-identified patent and that said Letters Patent is hereby corrected as shown below:

Col. 2, line 44, delete "rides", insert -- ride --.

Col. 2, line 54, after "from", delete "outlet", and insert -- inlet --.

Col. 3, line 3, after "dependent", insert -- on --.

Col. 3, line 18, delete "enable", and insert -- enables --.

Col. 4, line 30, after "and", insert -- said --.

Signed and Sealed this

Thirteenth Day of March, 2001

Attest:

NICHOLAS P. GODICI

Attesting Officer   Acting Director of the United States Patent and Trademark Office